A. J. KLONECK.
GEARING FOR ENGINE STARTING AND LIGHTING GENERATORS.
APPLICATION FILED MAY 16, 1917.

1,427,301.

Patented Aug. 29, 1922.

WITNESS:

INVENTOR.
Austen J. Kloneck.

UNITED STATES PATENT OFFICE.

AUSTEN J. KLONECK, OF NEW YORK, N. Y.

GEARING FOR ENGINE STARTING AND LIGHTING GENERATORS.

1,427,301.      Specification of Letters Patent.      Patented Aug. 29, 1922.

Application filed May 16, 1917. Serial No. 168,981.

*To all whom it may concern:*

Be it known that I, AUSTEN J. KLONECK, a citizen of the United States, and a resident of New York, in the county of New York and State of New York, have invented certain new and useful Improvements in Gearings for Engine Starting and Lighting Generators, of which the following is a specification.

This invention relates to electric starting and current generating systems for explosion engines wherein a single dynamo electric machine is employed for alternately operating as a motor or as a generator.

The object of the invention is to produce an automatically operating speed change gearing whereby a single dynamo electric machine will operate at different speeds as a motor or as a generator.

It is desirable to have a motor running at a high speed to turn an engine slowly to start the engine. On the other hand when the engine attains its own speed it is desirable to drive the generator at a lower speed than that which would be obtained by means of the starting gearing.

The above and other allied objects are attained by a novel combination of parts hereinafter described and shown in the accompanying drawings in which:—

Figure 1:
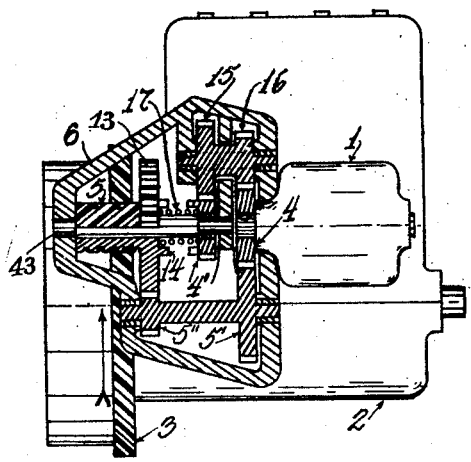
Figure 2:
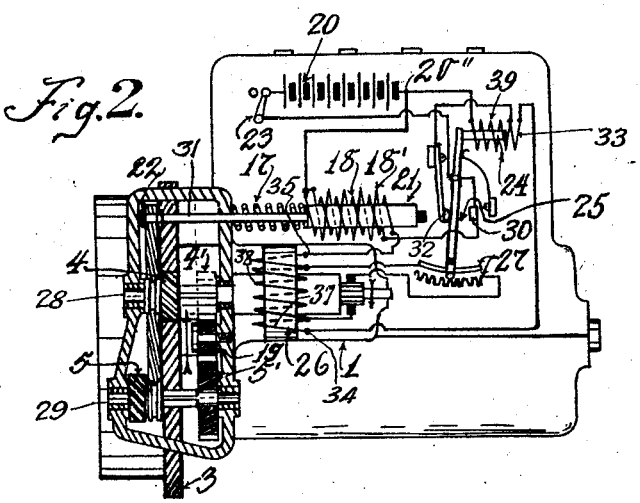

Figure 1 shows an elevational view of an engine and a dynamo electric machine having a speed change transmission therebetween. Figure 2 shows a modified gear transmission for accomplishing the desired object.

Referring more particularly to the drawing in which like characters of reference denote similar parts, the numeral 1 designates a dynamo electric machine, 2 an engine, 3 a gear connected to the engine, 4 is a gear connected at the dynamo end of the transmission, and 6 is a frame for holding said parts in position.

In Figure 1, the gear 3 of the engine and the cooperating gear 5 of the transmission are provided with spiral teeth adapted for automatically changing the transmissions. Gear 5 slides upon a shaft 43 and alternately causes the engagement of different gears arranged between the dynamo and the explosion engine. Said spiral teeth of gears 3 and 5 slide said gear 5 to the left hand position which is illustrated wherein motor 1 drives by gears 4, 5', 5'', 13, 5, 3 the engine 2 in starting; or to the right hand position not shown, wherein the engine 2 drives the dynamo 1 as a generator by gears 3, 5, clutch 14, gears 4', 15, 16, and 4, when the engine 2 runs by its own power. The spiral shaped teeth of gear 3 in driving gear 5 will produce a side thrust upon gear 5, causing a movement of the latter to the right hand side wherein gear 13 will be disengaged from said starting gear transmission and the running gear transmission engaged by causing clutch 14 of gear 5 to engage with gear 4' of the dynamo electric machine. The dynamo will then be driven from the engine through gears 3, 5, 4', 15, 16 and 4. Said gear changing will mainly be operated by the spiral teeth of gears 3 and 5. However, a spring 17 is additionally employed to shift gear 5 to the starting position with gear 3.

In Figure 2, a shifting from a starting to a running transmission for the dynamo electric machine is automatically accomplished by means of the spiral tooth shape of gears 3, 4 and 5. Gears 4 and 5 are slidably keyed on shafts 28 and 29. The movements of both gears 4 and 5 are simultaneous and controlled by a common shifting bar 22. However, additional automatic shifting operations are provided by a spring 17 which acts on the shifter bar 22 by means of a rod 31 and moves gear 4 to mesh with gear 19, and gear 5 to mesh with gear 3 of the engine for starting the latter. An electromagnet 18, 18' acts on a magnet core 21 and through a rod 31 upon the shifting bar 22 to move the gears 4 and 5 to the illustrated position for driving the dynamo electric machine as a generator. Spring 17 will shift gear 4 out of mesh with gear 3 and engage gear 5 to the gear 3. Gear 5 is operated by the dynamo electric machine through the gear 4 in the starting position 4' of gear 4. Gear 4 meshes with the gear 19, which latter is connected with gears 5' and 5 to gear 3 of the engine. A source of current 20 which supplies the dynamo electric machine as a motor has its current flowing in opposed directions through the coils 18 and 18' of the shifting magnet 21 during starting. But when the dynamo electric machine generates a higher emf. than that of battery 20, the flow of current through coils 18 and 18' will be in the same direction causing the attraction of iron core 21. The latter then causes the shifting of gears 4 and 5 by the shifting bar 22 which is connected to the iron core 21. A switch 23 is provided for closing the battery circuit for the dynamo electric machine for starting the engine.

When switch 23 is closed, current flows from one terminal of the battery through switch 23, arm 25 and contact 32 to a point on coil 24. The current then flows in opposed directions through coils 39 and 33. One end of coil 39 is connected to the second terminal of the battery and one end of coil 33 is connected to the terminal 34 of the dynamo. The second terminal of the battery 20 is connected through a series coil 18 of the shifting magnet 21 to terminal 35 of the dynamo electric machine 1. The battery current also flows through a shunt coil 18′ of the shifting magnet 21. The core of the latter is then in the proper position to allow the engine to be started. Contact arm 25 is employed for preferably periodically closing the circuit of the shunt coil 18′ by a contact 30 although contact 30 may remain in connection with arm 25 continuously. The magnetic forces of both coils 18 and 18′ are opposed to one another when battery current flows through the coils adapted to prevent a shifting of the gears. But a dynamo generated current will produce a similar magnetic force in the series coil 18 as in the shunt coil 18′, thus causing an energization of the magnet and core armature 21 and a shifting of the gears to the illustrated positions. The battery current further flows in one direction through a shunt coil 39 of the regulating magnet 24 in the circuit 20, 20″, 39, 32, 25, 23 and 20; and in an opposed direction through the series coil 33 in the circuit 20, 20″, 18, 35, 34, 33, 32, 25, 23 to 20, causing a deenergization of magnet 24 and a reduction of the armature resistance 27 by the releasing of contact arm 25; and later an opening of contact 32 if the engine runs at too low a speed to drive the dynamo electric machine at a required speed for generating a current of the desired voltage, thus preventing an unnecessary discharging of battery 20. During starting contact 32 is pressed against arm 25 either by hand or by means of core 21. A dynamo generated current however will then flow through the series coil 33 of the regulating magnet 24 in the same direction as through the shunt coil 39 in the circuit 34, 33, 39, 20″, 18 and 35 of the dynamo and energize magnet 24 proportional to its voltage, thus varying the current generated by the dynamo proportionally to the desired value by varying the resistance 27 in the armature circuit and charging the battery 20, if needed. A further current regulation of the dynamo electric machine is provided by a certain arrangement and connections of series field coils 37 and shunt field coils 38 and the armature terminals of the dynamo electric machine. When the latter operates as a motor then the battery current surges in a similar direction through the series field coils to the armature and through the shunt field coils and is adapted to producing a strong magnetic field for the motor operation. By operating the dynamo electric machine as a generator the generated armature currents will surge in opposed directions through its series and shunt field coils 37 and 38 causing proportional to an increased current through the series field coils 37 a weakening of its field magnetism and thus a reduction of the generated current.

If the armature current should drop below a certain value it will deenergize the regulating magnet 24, and the contact arm 25, actuated by spring 25′, after having already switched out the resistance 27 will open contact 32 and thus open the circuit 34, 33, 32, 25 and 23 with the battery 20 preventing a discharging of the battery through the dynamo, but it will energize the shifting magnet 21 by coil 18′ in the circuit 20, 20″, 18′, 30, 25, 23 and 20 to hold the gears in the running position of the engine separately from the spiral shape of teeth for this purpose. When the dynamo again begins to generate a current of a higher emf. than that of battery 20 it will energize the regulating magnet 24 by flowing in a similar direction through its magnet coils 33 and 39 in the circuit 1, 34, 33, 39, 20″, 18, 35 and 1 of the dynamo. The arm 25 will then close the contact 32 between the dynamo and the battery and resume charging of the battery if needed.

Having now fully described my invention, what I claim as new and desire to secure by Letters Patent is:—

1. A device of the character set forth, comprising an engine, a gear connected with said engine, a dynamo electric machine adapted for operation as a generator or as a motor, a shaft in connection with said dynamo electric machine, a gear mounted thereon and movable in an axial direction, means for occasioning a sliding of said second mentioned gear comprising spiral shaped teeth on said first and second mentioned gears, said two mentioned gears engaging with one another for driving said dynamo electric machine as a generator, and speed reduction gearing arranged between said engine gear and said dynamo electric machine adapted for an automatic engagement by means of the sidewards sliding operation of said spiral teeth of said mentioned gears when the dynamo electric machine operates as a motor.

2. A starting and generating mechanism comprising an engine, a dynamo electric machine, a shaft in connection with said dynamo electric machine, a gear keyed upon said shaft, a gear connected with said engine, a third gear and a speed reduction gearing arranged between said third mentioned gear and said dynamo electric machine, and means for automatically engaging said first and third mentioned gears with said engine gear alternately.

3. In a device of the character described, the combination of an engine, an engine connected gear, a dynamo electric machine operating at different times as a generator or as a starting motor for said engine, a second gear connected with said dynamo electric machine and meshing with said engine gear at one time, a third gear meshing at another time with said engine gear, and speed reduction gears arranged between said third gear and said dynamo electric machine, and means for automatically controlling the engagements of said second and third mentioned gears with said engine gear.

4. The combination, of an explosion engine, a dynamo electric machine, a plurality of gears arranged between said dynamo electric machine and said explosion engine, two of said gears movably arranged with respect to a third gear and means for alternately and automatically engaging one of said two mentioned gears with said third gear for operating said dynamo electric machine as a starting motor or as a generator, and a separate means for moving the gears to the starting position for said engine.

5. A device for starting explosion engines and for generating electrical current by the same, including a dynamo electric machine and means for automatically connecting the latter with said explosion engine at two different speed transmissions, comprising two gears for engaging a third gear alternately as necessary, and means for automatically controlling the operation of said device, including suitable electric circuits and elements including said dynamo electric machine for operating said dynamo electric machine as a starting motor or as a current generator, said mentioned two gears being movably arranged for alternately engaging with said third mentioned gear, one of said mentioned two gears being connected to a shaft of said dynamo electric machine.

In testimony whereof I hereunto subscribe my name to this specification in the presence of two witnesses.

AUSTEN J. KLONECK.

Witnesses:
JULIUS BRAWNER,
FRED MAURIBER.